United States Patent [19]

Kosloff et al.

[11] Patent Number: 5,629,904
[45] Date of Patent: May 13, 1997

[54] MIGRATION PROCESS USING A MODEL BASED APERTURE TECHNIQUE

[75] Inventors: Dan D. Kosloff, Ramat-Aviv; Oleg V. Meshbey, Lod; Zvi Koren, Ramat-Gan, all of Israel; Alexander Litvin, London, United Kingdom

[73] Assignee: Paradigm Geophysical, Ltd., Israel

[21] Appl. No.: 346,891

[22] Filed: Nov. 30, 1994

[51] Int. Cl.[6] .................. G01V 1/28; G01V 1/36; G06F 15/00
[52] U.S. Cl. .................. 367/53; 367/21; 364/421
[58] Field of Search .................. 367/21, 53, 63; 364/421

[56] References Cited

U.S. PATENT DOCUMENTS

| | | |
|---|---|---|
| H482 | 6/1988 | Berryhill et al. . |
| 4,203,161 | 5/1980 | Johnson et al. . |
| 4,204,279 | 5/1980 | Parrack et al. . |
| 4,464,737 | 8/1984 | Pann . |
| 4,479,205 | 10/1984 | Gray . |
| 4,628,492 | 12/1986 | Winney . |
| 4,745,585 | 5/1988 | Larner . |
| 4,780,859 | 10/1988 | Hadidi et al. . |
| 4,797,860 | 1/1989 | Quaglino . |
| 4,878,204 | 10/1989 | Black et al. ............ 367/53 |
| 4,888,742 | 12/1989 | Beasley ............ 367/53 |
| 4,922,465 | 5/1990 | Pieprzak et al. . |
| 4,943,950 | 7/1990 | Beasley et al. ............ 367/54 |
| 4,964,103 | 10/1990 | Johnson . |
| 4,987,561 | 1/1991 | Bell ............ 367/53 |
| 5,008,861 | 4/1991 | Gallagher ............ 367/59 |
| 5,058,079 | 10/1991 | Wright et al. . |
| 5,073,875 | 12/1991 | Kelly et al. . |
| 5,083,297 | 1/1992 | Ostrander . |
| 5,198,979 | 3/1993 | Moorhead et al. . |
| 5,235,556 | 8/1993 | Monk et al. . |
| 5,274,605 | 12/1993 | Hill ............ 367/53 |

OTHER PUBLICATIONS

Bancroft et al, 64th SEG Mtg., Oct. 23, 1994, pp. 672–675; Abst only herewith.
Versteeg, R.J., Geophysics, vol. 58, #6, Jun. 1993, pp. 873–882.
Benson, A.K.; Geophysics, vol. 56, #9, Sep. 1991, pp. 1412–1422.
Kosloff et al; 56th BAEG Mtg., Jun. 6, 1994, Pap. No. P061, 2 pp; abst. only herewith.
Yilmaz et al, Geophysics, vol. 49, #10, Oct. 1984, pp. 1664–1674.
Wang, D.; Dissertation, Dec. 1990, University of Wyoming, pp. 1–101.
Geist, LaRay. (1987), Geobyte, vol. 2, No. 3, *Migration Aperture Diagnostics on a Mac or PC*, pp. 18–24.
GeoDepth Technical Note 6, (Dec. 1993). *Using a Displacement Section for Pre–Stack Wave Migration.*

Primary Examiner—Nelson Moskowitz
Attorney, Agent, or Firm—Vaden, Eickenroht & Thompson, L.L.P.

[57] ABSTRACT

A method for efficiently and accurately migrating seismic data recorded from an area of interest is disclosed. The method utilizes determining displacement values for every output sample in an area of interest, preferably by generating a displacement section from a velocity section and depth model. The displacement values are then used to select a migration aperture for the migration algorithm.

9 Claims, 6 Drawing Sheets

MIGRATION PROCESS USING A MODEL BASED APERTURE TECHNIQUE

BACKGROUND OF THE INVENTION

1. Field of the Invention

The present invention pertains to a method for improving the quality and a fidelity of seismic images created by the process of "Seismic migration." More particularly, the present invention deals an automatic way to calculate a "model based migration aperture," which determines the range of the seismic data that is most relevant for imaging a selected area in depth.

2. Description of the Prior Art

Seismic data is gathered by generating seismic pulses into the earth and detecting the reflected, refracted, or diffracted waves with seismic receivers. A two-dimensional seismic profile (or spread) consists of a single source (shot) and a series of receivers located uniformly along a line. Such a configuration of source and receivers is called common-shot ("CS") profile. Typical distance between receivers is in the order of several tens meters, where for about hundred receivers, the spread length may extend to several kilometers. Continuous profiling results from moving a seismic profile by constant steps, usually equal to the receivers interval, along a seismic line. Thus, an individual seismic line may extend for distances of several tens kilometers.

A CS seismic record is a set of traces, each representing a receiver, for a given shot. The recorded amplitudes represent the acoustic pressure (at sea) or the particle velocity (on land) as a function of time. Seismic traces typically extend from five (5) seconds ("sec") to ten (10) sec in time since hydro carbon reservoirs rarely occur below seven (7) kilometers. ("km") in geologic basins, where velocity of the propagating waves ranges from 1.5 km/sec to seven (7) km/sec. The detected signals contain frequencies from a few hertz to a few hundred hertz, and are sampled at one, two, four or eight millisecond ("msec") intervals.

In the seismic reflection methods, the data is commonly rearranged from CS gathers to common-midpoint ("CMP") records. A CMP record consists of traces corresponding to source-receivers pairs located symmetrically about a CMP. Thus a CMP represents a point where the locations of the shot and the receivers coincide. It is also called the zero offset point. The number of shot-receiver pairs used in a CMP record determines the subsurface coverage (fold).

The subsurface of the earth is assumed to consist of a sequence of geological layers separated by curved interfaces. For seismic imaging, the most significant material parameter is the velocity of the propagating waves. When a seismic wave travels down through the earth and hits an interface, separating two different material regions, a portion of the wave is reflected back to the earth surface and detected. The recorded pulses within the seismic traces yield an image of the subsurface indicating major geological interfaces (reflections). This image is applicable only as long as the interfaces are continuous and horizontally flat and when no lateral velocity variations within the layers exist. However, the subsurface of the earth might be complex, especially in areas of hydrocarbon traps, where the interfaces are discontinuous curved surfaces broken by faults. In such areas the reflections are misplaced and the seismic image is distorted by diffractions. For this reason, a process of migration is routinely performed.

Migration is a process which maps seismic pulses which are recorded in the time domain into a depth domain through a wave equation and a suitable velocity field. Specifically, seismic migration is an inversion operation involving rearrangement of seismic information elements so that reflections and diffractions are plotted at their true locations. Originally, migration was performed by hand on interpreted seismic data. In current practice, computer operations are performed typically on uninterpreted data using some form of, or approximation of, the wave equation by way of one of several solutions: solution in the space time domain by a finite-difference method; solution in the integral form (Kirchoff migration); solution in the frequency domain; or solution by a combination of the previously mentioned domains. Examples of migrating techniques are shown in U.S. Pat. Nos. 4,464,737; 4,479,205; 4,745,585; 5,198,797 and U.S. Statutory Invention Registration No. H482.

More specifically, seismic data migration is the inverse of seismic wave propagation. Under Huygen's principle, as a seismic wave propagates through a subsurface, each point it passes becomes a secondary point source. These secondary point sources radiate the energy in all directions. The arrival times of the energy which returns to geophones at the surface from such a secondary point source forms a "hyperbolic event" often referred to as a curve of maximum convexity or a diffraction curve.

A stacked seismic section approximates the recording of all of the hyperbolic events from all of the points the wave passed through for some finite period of time. The reflections seen on a stacked section are simply the areas where the hyperbolic events reinforce one another. A stacked seismic section is always out of focus and is often highly distorted. The focus deteriorates with depth because the curves of maximum convexity become more flattened. The distortion is most evident on the dipping data, which appear down dip from their proper spatial locations. Migrating seismic data is an attempt to reverse the focus distortion process of the propagating seismic waves recorded. Seismic migration focuses all of the data and relocates the dipping data to their proper spatial locations.

In principle, all seismic migration algorithms "collect and combine" the data along the curve of maximum convexity for every point within the subsurface and output the data at its apex. The term "collects and combines" in this context covers everything from simple stacking to frequency/phase filtering with complex weighing, etc. Collection and combination may occur in one of several different domains.

The aperture of a migration algorithm is the limit to which the algorithm reaches out to collect the data along the curves of maximum convexity. Almost all Kirchoff or summation migration algorithms require the aperture to be time variant. Some allow the aperture to be space variant. Many allow the aperture to be asymmetrical and therefore require the specification of the aperture for both the left and right hand sides of the operator. Some algorithms allow and/or require that the aperture be frequency dependent.

In Kirchoff integral migration algorithms the maximum apparent dip and the maximum operator length usually determine the aperture. The maximum apparent dip parameter restricts the aperture by having the algorithm collect data along the curves of the maximum convexity curve up to the point where the slope reaches the maximum apparent dip. Since the curvature of the maximum convexity curves decrease with depth, their slopes may never reach the maximum apparent dip in the deeper portion of the section. The maximum operator length acts as a fail safe provision which limits the absolute length of the operator regardless of slope. The maximum apparent dip and maximum operator length are typically selected by visual inspection and, thus, have heretofore relied totally on user judgement.

The migration aperture is determined by the size (usually specified as a length) of the migration operator. The terms "migration aperture" and "migration operator size" often are used interchangeably. Migration aperture, however, evokes the analogs between the processes of seismic migration, achieving accurate spatial location and optical focusing to thereby achieve adequate fidelity of the migrated results. In this context, reasonable fidelity means that the migrated data retain their relative amplitudes, phase, and frequency contents. Thus, a seismic migration process "migrates" dipping data to their proper spatial locations and simultaneously focuses the dipping and non-dipping data. An adequate migration aperture is large enough to "migrate" dipping reflections to their proper spatial locations and to focus them with reasonable fidelity.

In generals as the migration aperture is increased, the ability of the algorithm to "migrate" dipping data to their proper spatial locations with reasonable fidelity is improved. However, since seismic data sets are spatially discrete (i.e, each trace is recorded separately), the aperture of migration algorithms must be restricted to avoid the degrading effects of spatial aliasing. This is a fundamental tradeoff in all migration processes. An aperture must be large enough to properly migrate the dipping data and yet not so large as to introduce artifacts from spatial aliasing.

The requirements to migrate seismic data properly, regardless of the technique used, include an appropriate velocity model, a good migration algorithm, and an adequate migration aperture. Although there are many different migration algorithms, the basic principles involved in the specification of an adequate migration aperture are the same. The specification of an adequate migration aperture can be separated into two parts that insure the proper spatial location and fidelity of the migrated results, respectively. Therefore, as previously stated, an aperture must be specified that is large enough to properly migrate the dipping data and yet not so large as to introduce artifacts from spatial aliasing.

Even when an exact velocity model and the best migration algorithm are used, an inadequate migration aperture will cause the resulting migrated seismic section to be seriously flawed. An inadequate migration aperture can reduce the relative amplitude of dipping data, distort the frequency and/or phase content of the reflections, or, in extreme cases, fail to position dipping data in their proper spatial locations. Furthermore, these serious flaws often go undetected.

Typically, once the aperture is determined for a given section or volume, the aperture remains constant throughout the entire migration process. Since the characteristics of the subsurface data tend to vary drastically throughout a data section or volume, an aperture selected for one part of the data section may not be optimum for another part. Therefore, typically an aperture is selected to be large enough to be appropriate for all data in the data set, requiring an enormous amount of processing time to complete the migration of all the data in the data set.

It is, therefore, a feature of the present invention to automatically calculate a migration aperture size from a seismic data set to be migrated, rather than rely on user judgement to determine the aperture size.

It is another feature of the present invention to provide a method of migrating seismic data using a different migration aperture for every part of seismic data or a seismic data volume.

It is yet another feature of the present invention to provide a method for optimizing seismic data migration by limiting the area to be migrated in accordance with a displacement section of the data.

It is still another feature of the present invention to provide a means to verify the accuracy of a velocity section of an area of interest.

SUMMARY OF THE INVENTION

These feature and advantages as well as others are obtained by a method of calculating a space varying model based migration aperture. The method is based on tracing reflecting rays from the imaged points (also called, common reflection points ("CRP")) along the given depth interfaces, up to the earth's surfaces at a CMP location. The lateral distance, the displacement, between each CRP and CMP determines a local migration aperture for reflecting waves. A displacement model is determined by ray tracing using an accurate velocity model and depth model. The normal incidence rays, rays normal to a given reflector, in the displacement model indicate the data on the CMP records related to the apex of the curves of maximum convexity mentioned above. The computed displacements are then interpolated for all imaged CRPs between the depth interfaces to obtain a displacement section.

The calculated displacement section is mainly important to Kirchoff type migrations. In this approach, each trace within a selected gather is migrated into depth. The selected trace determines a certain CMP location and shot-receiver pair located symmetrically about the CMP with a given offset. A range of imaged points defined by the aperture are then scanned. From each point, travel times to the given shot and receiver are calculated (typically the travel times are calculated prior to the migration) to migrate the corresponding time event on the trace to the given depth points. Only imaged points within the local aperture are considered for the migration.

Displacement section values determine the relation of the output imaged points, the CRPs, with the input CMP traces, whereas, the migration aperture indicates the output image that is relevant for the given input trace. Therefore, in some circumstances the migration aperture can be taken to be double the displacement value to ensure that all the imaged area of interest is migrated.

Specifically, a method is disclosed for migrating a seismic input trace in a seismic data section recorded in the time domain from an area of interest into output samples in the depth domain. This method includes the steps of generating a field of travel times for the input trace, selecting the output samples desired, identifying a displacement for each output sample, locating a CMP associated with the displacement of each output sample, selecting an aperture gate relative to the CMP for each output sample, and migrating the input trace to the output samples using the field of travel times when the input trace CMP is within the aperture gate of each output sample.

In the preferred embodiment of this invention, a displacement section is generated including all the displacements of the output samples from which the CMP are derived. A method for generating the displacement section is comprised of the steps of generating a displacement section for the seismic data section including the displacement for each output sample, generating an interval velocity section for the area of interest, generating a depth model for the area of interest, developing a displacement model for each seismic horizon by performing ray tracing on the depth model utilizing the velocity section, and interpolating the displacement model to generate a displacement section for the area of interest.

It is also preferable to develop the travel times field using a ray tracing technique. A direct solution of the eikonal equation may be used.

An alternate method can be used of migrating each seismic input trace in a seismic data section recorded in the time domain from an area of interest into output samples in the depth domain. This method or process utilizes a algorithm which uses an aperture for migrating seismic data, such as the Kirchoff integration algorithm, and includes the steps of generating a displacement section for the seismic data section, identifying the maximum displacement on the displacement section, selecting a migration aperture based on the maximum displacement, and migrating each seismic trace to the depth domain data set using the migration algorithm with the selected aperture. In the preferred embodiment of this invention the aperture is two times the maximum displacement.

In yet another procedure utilizing this invention, the displacement section is used in a method of verifying the accuracy of a interval velocity section of a seismic data section. This method includes the steps of generating a field of travel times for the input trace, recording seismic input traces in the time domain from the area of interest, generating a depth model for the area of interest, developing a displacement model for each seismic horizon in the area of interest by performing ray tracing on the depth model utilizing the velocity section, selecting the output samples desired, interpolating the displacement model to generate a displacement section for the area of interest including the displacements for each output sample, locating a CMP associated with the displacement of each output sample, selecting an aperture gate relative to the CMP for each output sample, migrating each input trace to the output samples using the field of travel times when each input trace CMP is within the aperture gate of each output sample, generating a migrated CMP gather for the output samples once all the input traces are migrated, and analyzing the migrated CMP to identify a predetermined pattern representing the use of an accurate velocity section.

BRIEF DESCRIPTION OF THE DRAWINGS

So that the manner in which the above recited features, advantages and objects of the invention as well as others which will become apparent, are obtained and can be understood in detail, more particular description of the invention briefly summarized above may be had by reference to the embodiments thereof which are illustrated in the appended drawings, which drawings form part of this specification. It is to be noted, however, that the drawings illustrate only preferred embodiments of the invention and are therefore not considered limiting of scope as the invention may admit to other equally effective embodiments.

DESCRIPTION OF THE PREFERRED EMBODIMENT

Figure 1:
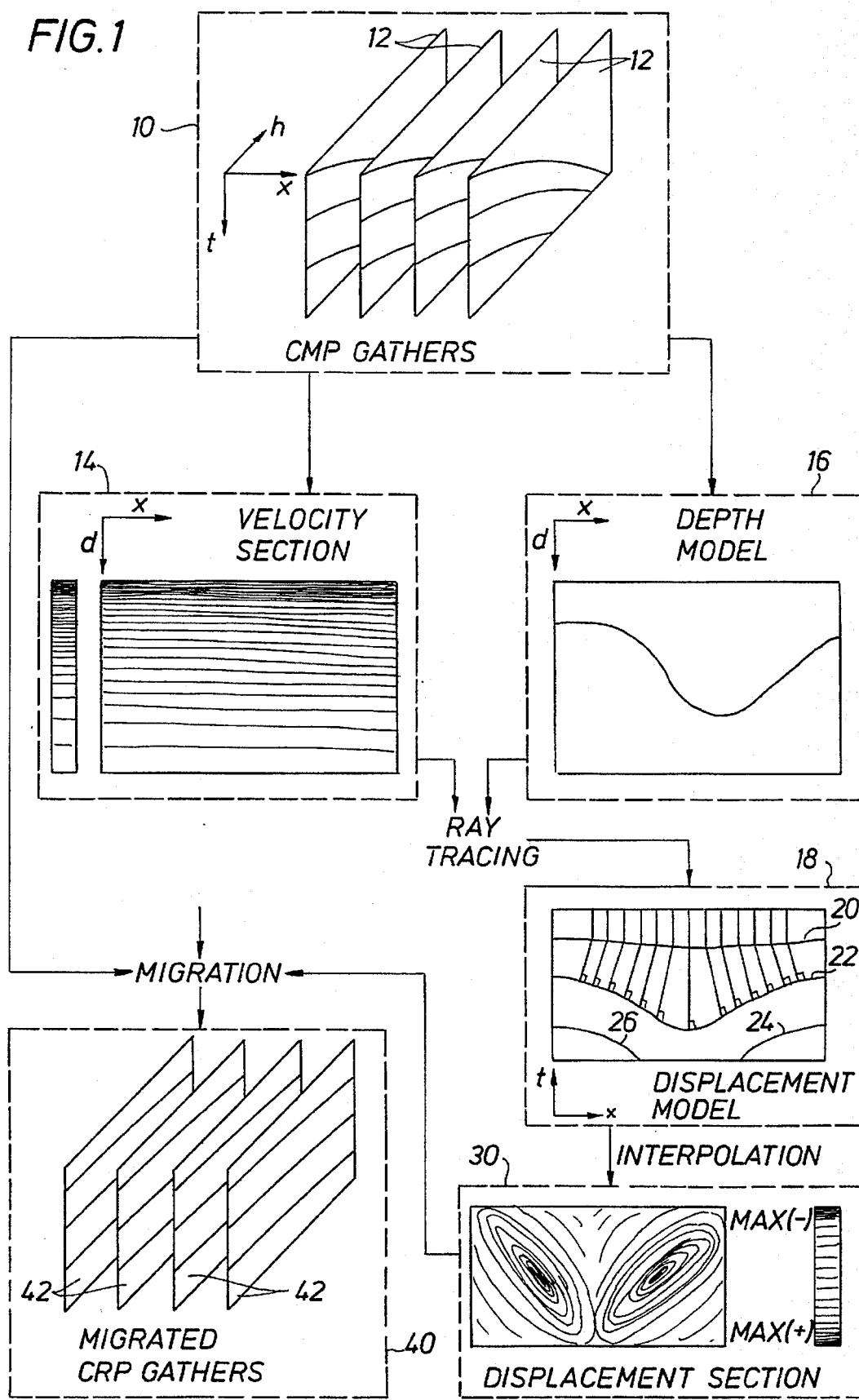
FIG. 1 is a diagram of the model based aperture migration technique of the preferred embodiment or method of this invention.

Referring to FIG. 1, an illustration of the present invention is depicted. Block 10 illustrates four graphs 12, each representing an individual CMP gather. The x-axis represent the CMP location along the surface of an area of interest, the t-axis indicates the two-way travel time, and the h-axis represents the offset or the horizontal distance from the source to the geophone. These CMP gathers include data gathered for that midpoint from several different offsets. CMP gathering techniques are commonly used and well known to those of ordinary skill in the art.

The CMP gathers are used to generate an interval velocity section and a depth model, such as those shown in blocks 14 and 16 preferably using a software package called GEODEPTH velocity modeling package, produced and distributed by the assignee of the present invention. Again, the x-axis represents the CMP location. The d-axis represents the subsurface depth calculated from the two-way travel time. Velocity section in box 14 includes a bar graph, which in this embodiment of the invention, shows that slower velocities are represented by darker colors. Even though the velocity section and the depth model of the present invention are generated from the actual CMP data preferably using the GEODEPTH software, any method for developing a velocity section and a depth model for an area of interest can be used. Such software is readily available and is used by persons of ordinary skill in the art.

Once a velocity section and a depth model are determined, conventional ray tracing techniques well known to those skilled in the art are utilized on this information to generate a displacement model for the area of interest, such as that shown in block 18. The displacement length for a point on a horizon, such as horizon 22, is the horizontal moveout of a normal ray. In general, the displacement is defined as the result of subtracting the common-reflection-point ("CRP") from the common-midpoint ("CMP").

Figure 2:
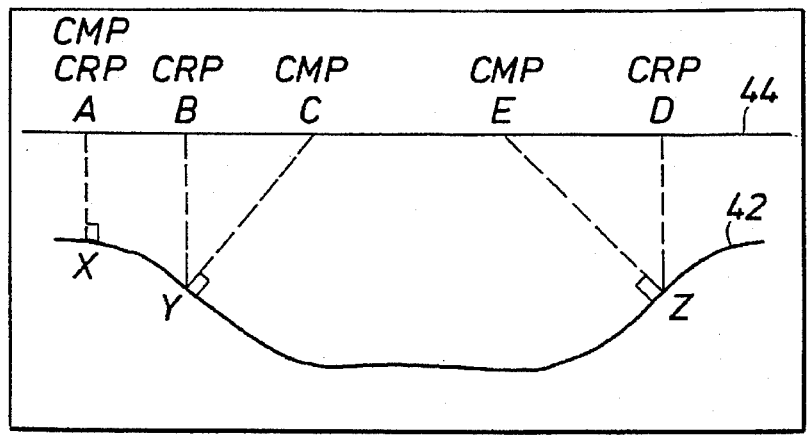
FIG. 2 is a graphical representation of the displacement between a common-midpoint and a common reflection point.

FIG. 2 shows a graphical representation of what is meant by "displacement." Points X, Y, and Z lie on subsurface horizon 42. Seismic waves transmitted from horizontal surface 44 are reflected off horizon 42 back up to surface 44. Since point X is on the part of the subsurface that is parallel to surface 44, the CMP and the CRP are both located at point A and, thus, there is no displacement for point X. When the CMP is greater (i.e., to the right in the drawing) than the CRP, as is the case for point Y, the displacement value is positive. Likewise, when the CRP is greater than the CMP, as is the case for point Z, the displacement value is negative. The horizontal distance between points B and C represents the displacement for point Y. The horizontal distance between points D and E represents the displacement for point Z.

It is preferable to use zero-offset ray tracing techniques when the area of interest is not very complex. However, far-offset tracing should be used with a more complex structure. Midpoints of different offset rays pair might not all be the same.

Block 18 of FIG. 1 shows a graphical representation of a displacement model of area of interest. Ray tracing was used to determine the normal rays reflected off surfaces 20, 22, 24, and 26 (only rays reflected from surface 22 are shown). The displacement model is then interpolated to determine the displacement lengths between the surfaces shown in Block 18 and generate a displacement section such as that illustrated in block 30, by interpolation techniques well known to those of ordinary skill in the art. This displacement section shows the maximum displacement lengths for a given area, with the darker section representing larger positive and negative displacement values. In practice, a displacement section is better illustrated in color. When interpolating the seismic displacement model to determine the displacement between surfaces 20, 22, 24, and 26, best results are achieved by using the "dominant surface" identified from the actual data. When interpreting between two nonparallel, intersecting, significant interfaces having several less significant interfaces there between, the dominant surface is the significant surface to which more of the less significant surfaces are parallel. Since displacement values are interpolated between surfaces it is better to pick as many horizons as possible to produce the displacement section in order to best simulate the subsurface. This is especially important in cases of steep dips and pinch outs, and where displacement values vary sharply from one location to the next.

The displacement section is then used in conjunction with the velocity section to migrate the seismic data in the CMP gathers to the appropriate spatial locations on CRP gathers in depth, such as those shown in block 40. The curved lines shown on CMP gathers 12 will be flat in migrated CRP gathers 42 if a proper velocity model is used.

A displacement section serves two primary purposes in the migration of the CMP gathers. First, the integration can be limited by selecting a fixed aperture from the displacement section, which reduces the amount of imaging time. Second, the displacement section provides for the varying of the aperture angle during the migration process.

Figure 3A:
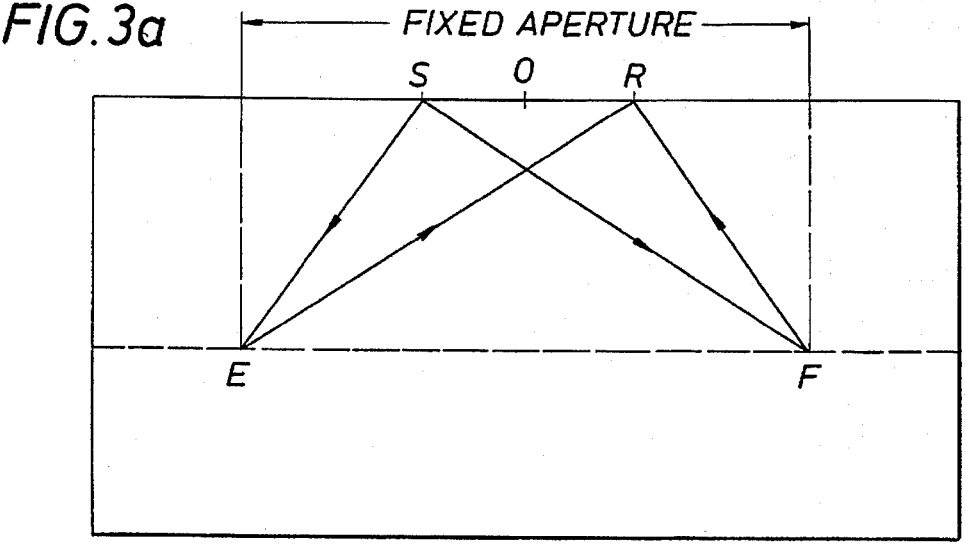
FIGS. 3a and 3b are graphical representations illustrating the technique behind selecting a fixed aperture for migrating seismic data.
Figure 3B:
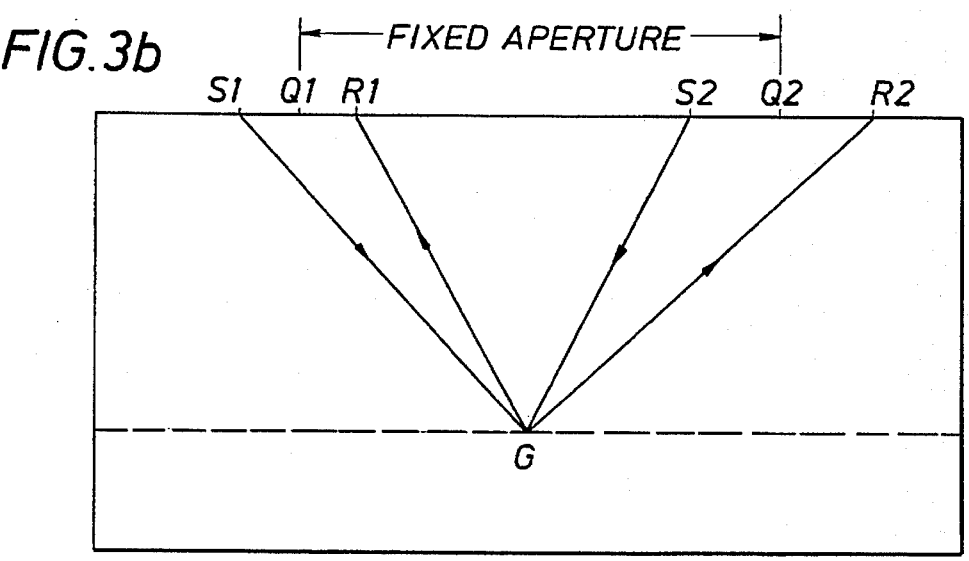

Referring first to the selection of a fixed aperture from the displacement section. The standard approach for fixed aperture migration is based on the assumption that each trace in a prestack seismic data set (hereinafter referred to as "an input trace") is imaged into output traces (hereinafter referred to as an "output sample") of a depth image wave field within a given aperture base. FIGS. 3a and 3b are presented to illustrate this concept. The samples of a trace with shot S and receiver R shown in FIG. 3a will be added with some time shift and weight to all traces of the output depth image between points E and F. The distance between points E and F is defined by the aperture length. Stated another way, energy at any depth point, such as G shown in FIG. 3b, is gathered from every input trace with a CMP location between points 01 and 02. The distance between 01 and 02 is defined by the fixed aperture length.

The fixed aperture approach to depth imaging is based on two concepts: (1) the interval velocity is used for calculating travel times only, which are applied before adding input traces to the output trace; and (2) the energy of any input trace is influenced by a wide part of the interface. The first concept is geometrical, suggesting that the structural information of the depth interval velocity model, the internal velocity section, is not used in the imaging process. The second concept is a physical one that defines the efficient area that forms the location in the depth wave field for a given input trace.

Typically when performing fixed aperture migration, the aperture is developed from the methods described in the Background section hereof and suffer from an inherent trade-off when optimizing an aperture; that is, in selecting an aperture that is large enough to properly migrate the dipping data and yet not so large as to introduce artifacts from spatial aliasing. An aperture that is very large and properly selected requires a significant amount of processing time.

However, it has been determined that selecting the fixed aperture based on the maximum displacement identified in the displacement section provides for a much more efficient and reliable migration of the seismic data. For example, in migrating data collected from very complex structures, it is best to determine the maximum absolute displacement from the displacement section and double it to define an aperture length to use in a migration algorithm that requires an aperture, such as the Kirchoff integration algorithm, to migrate the entire section. Migration using the Kirchoff integration algorithm is well known in the art.

Figure 4:
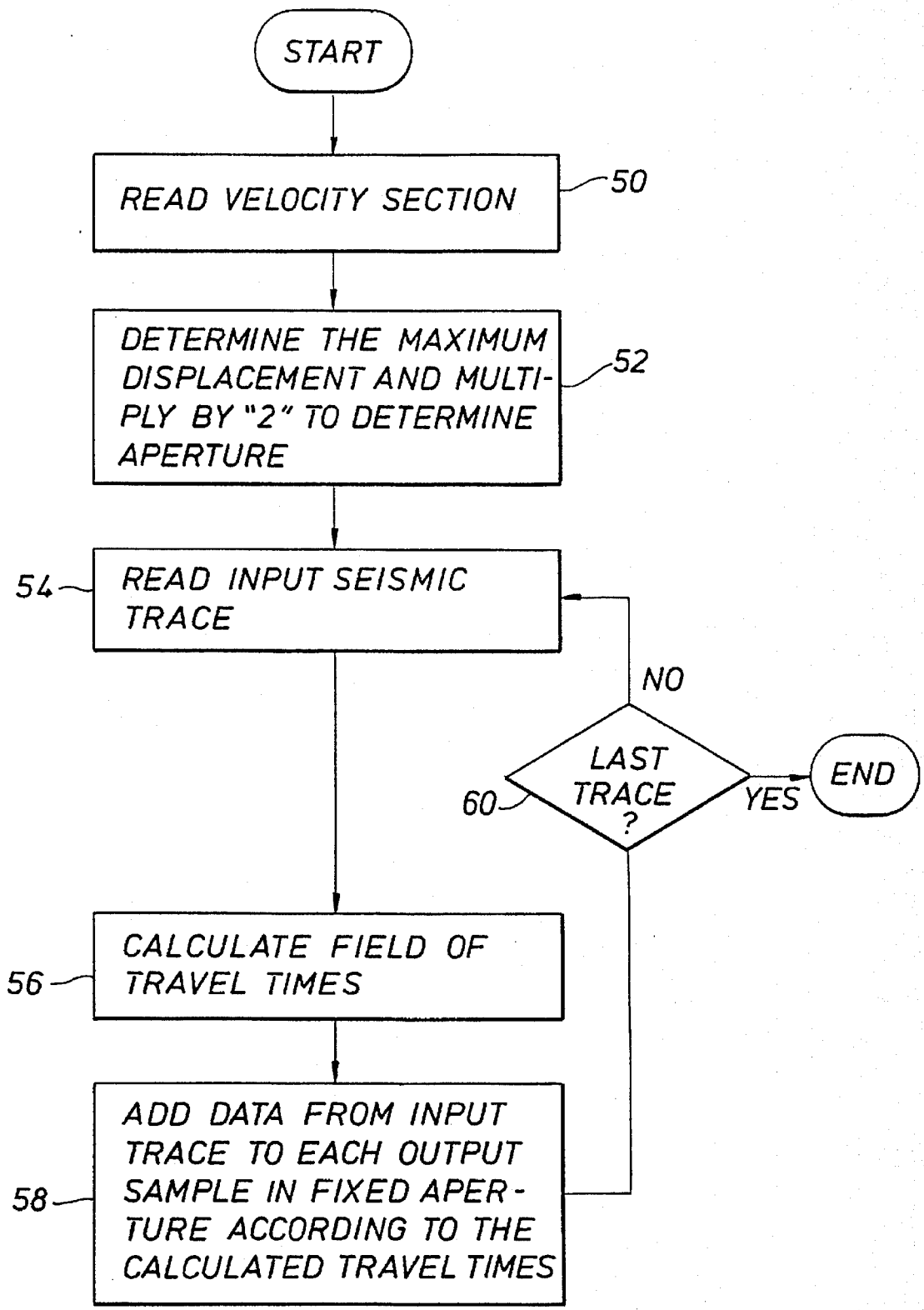
FIG. 4 shows a flow diagram of selecting a fixed aperture migration using the displacement section for migrating seismic data in accordance with this invention.

In order to perform fixed aperture migration in accordance with this invention, the steps shown in FIG. 4 are executed once the displacement section and a velocity section, such as those shown in FIG. 1, are developed for an area of interest. First, the velocity section is read, step 50, and the maximum absolute displacement is determined from the displacement section, step 52. The maximum displacement is then doubled to determine the aperture, step 52.

Once the maximum aperture is defined, all input traces are then migrated to every output sample in the depth wave field by the following process. First, an input seismic trace is read, step 54. Then, the field of travel times for that input trace is calculated, by techniques well known to those of ordinary skill in the art, step 56. Next, data from the input trace is added to each output sample in the fixed aperture: range according to the calculated travel times, step 58. These three steps are performed until the last input trace has been migrated, step 60.

The displacement section is preferably used to determine a model based aperture. The technique for determining model based apertures in accordance with a preferred embodiment or method of this invention is derived from two different concepts: (1) both structural and velocity information contained in an interval velocity (or depth) model are used in the migration process; that is, velocity information is used for the calculation of travel times and structural information is used for the calculation of the direction of reflection energy arriving at the receiver; and (2) the energy of any input trace is influenced by a relatively narrow part of the interface (reflector) around the reflection points.

Figure 5A:
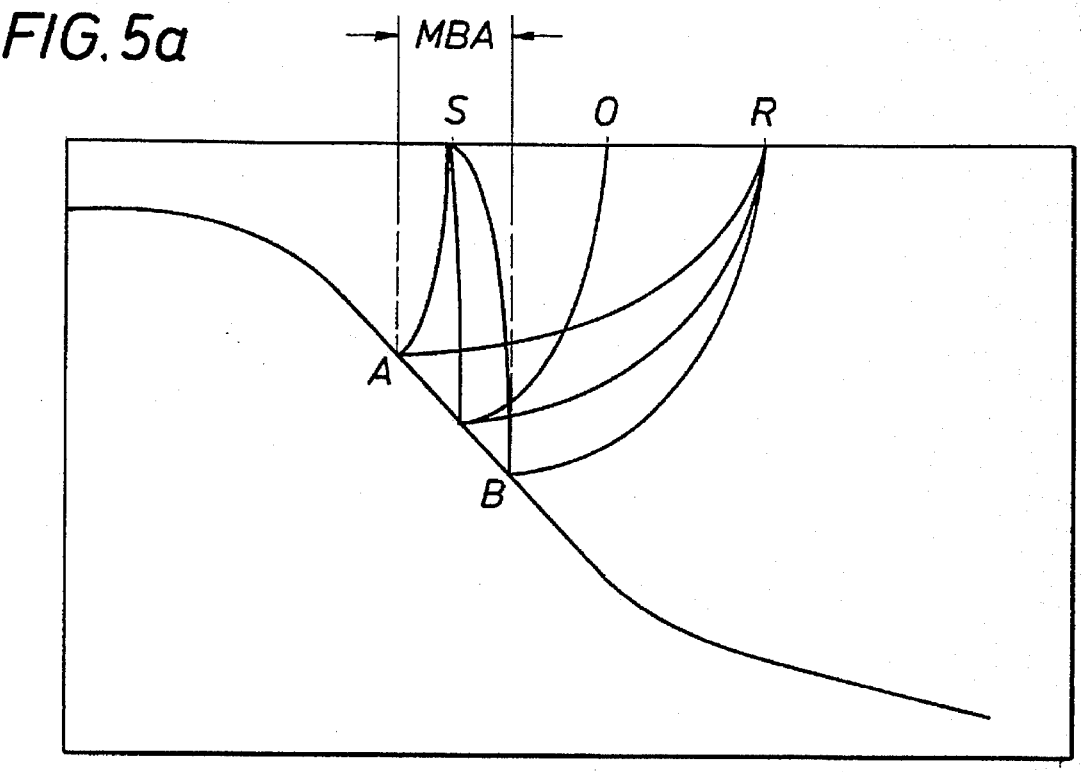
FIGS. 5a and 5b are graphical representations illustrating the technique behind selecting a model based aperture for migrating seismic data.
Figure 5B:
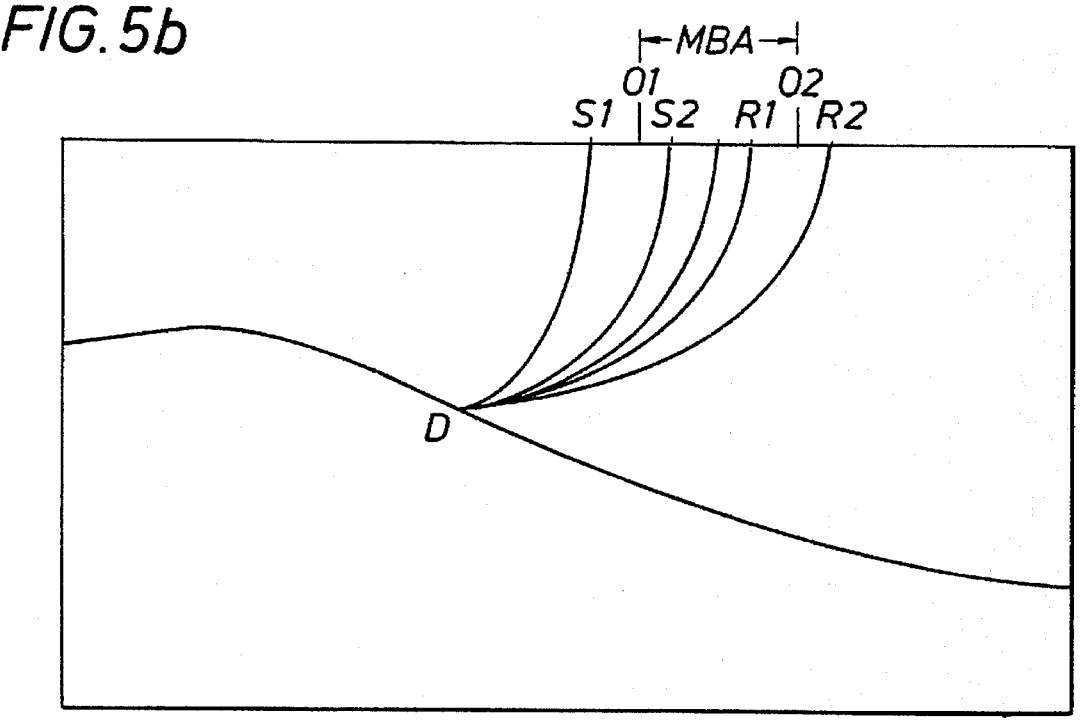

Referring to the first concept, since the depth or interval velocity model is available, the direction of reflection is known and used to calculate the output wave field of the depth image. This is done by stacking, not along the wide part of the diffraction time-distance curve, but only along the narrow part of it given by the direction of the arriving energy. The second concept of the model based aperture approach is consistent with the fact that the main part of the reflection wave field is produced by a relatively narrow area around the geometrical reflection point, described as the Fresnel zone (see FIG. 5a). FIG. 5b is a graphical representation of the basis of the model based aperture technique showing that all input traces within an aperture contribute to an output trace.

Figure 6:
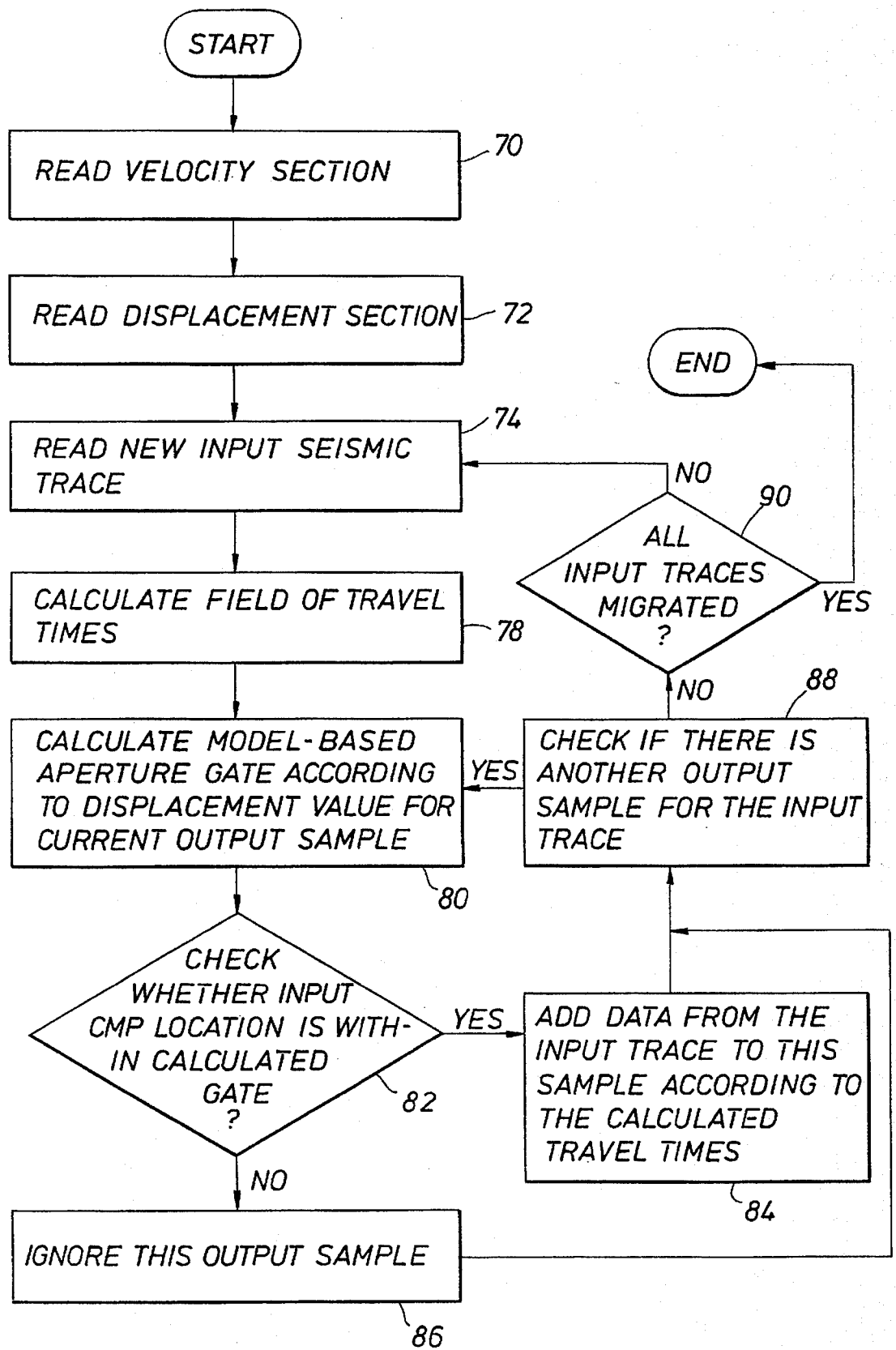
FIG. 6 shows the flow diagram of the process used to migrate seismic data utilizing the model based aperture technique in accordance with the preferred embodiment of this invention.

FIG. 6 shows the process for migrating seismic data using the model based aperture technique of a preferred embodiment of this invention, once a velocity section and a displacement section, such as those shown in FIG. 1, are generated. First, the velocity section and the displacement section are read, steps 70 and 72. Then, an input seismic trace is read, step 74, and a field of travel times is calculated from the velocity model, step 78, using techniques well known to those of ordinary skill in the art. For example, any ray tracing technique or the eikonal equation can be used to determine the travel times.

At this point, each output sample of the entire area of interest is then analyzed relative to the input seismic trace and a model based aperture gate according to the displacement value for the current output sample is calculated, step 80. Thus, the maximum displacement is determined for the current output sample and the CMP associated with that sample is identified. Then, a range around the CMP is identified to create the aperture gate around the CMP. The range can be a predetermined value that is always used until varied by the user. In the preferred embodiment of this invention, a 20 CMP aperture is used as a default value.

If the CMP location of the input trace is within the calculated gate, steps 82 and 84, then the data input trace is added to the output sample according to the calculated travel time in a manner well known to those of ordinary skill in the art. If the input trace CMP is not within the calculated gate, then the output sample is ignored, step 86. Every output is evaluated for an input trace, step 88. The same process is then repeated until all input traces are migrated, step 90.

Figure 7:
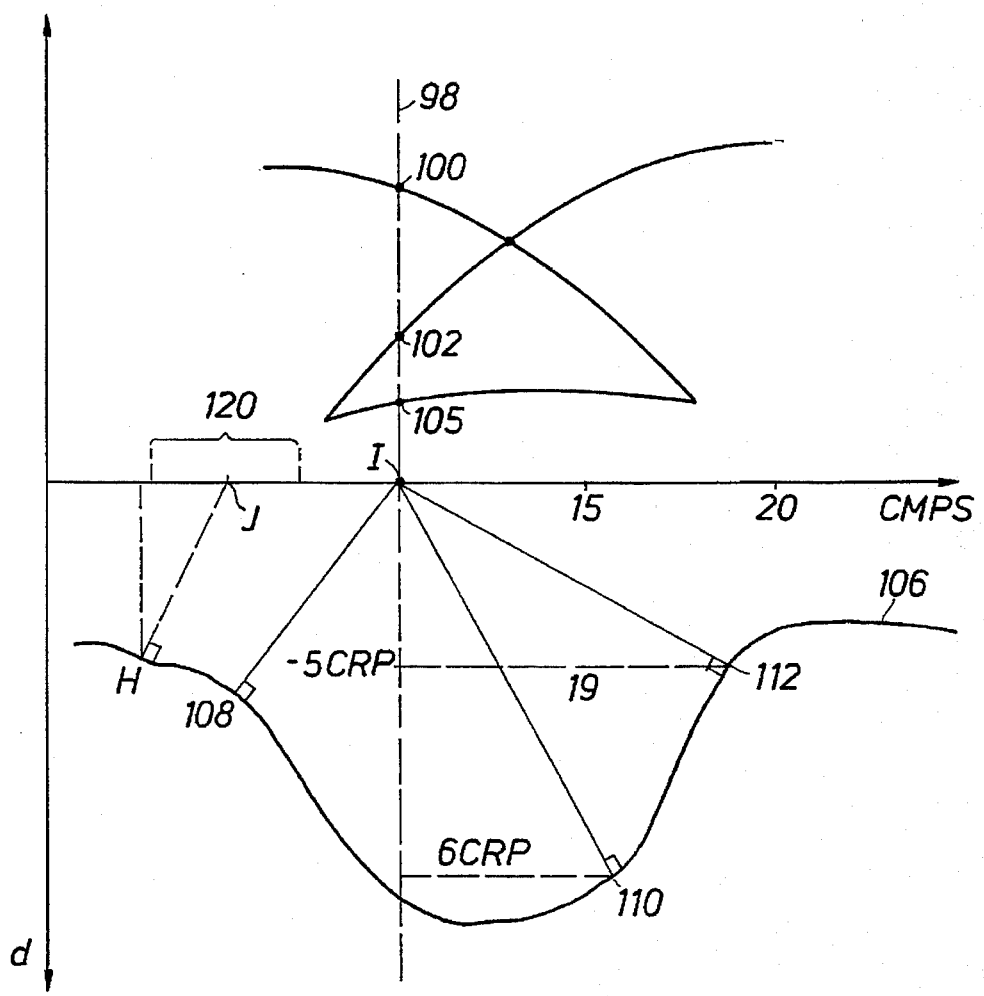
FIG. 7 is a graphical representation of aperture selection in accordance with the preferred embodiment of this invention.

To illustrate this process, refer to FIG. 7, where a graphical representation of input trace 98 is shown at CMP I. Input trace 98 includes signals 100, 102, and 105 reflected from surface 106 at points 108, 110, and 112, respectively.

In order to migrate input trace 98, the field of travel times is calculated. Then each output sample in the area of interest is evaluated to determine the model based aperture gate for that output sample according to the displacement section. For illustrative purposes only, assume the predetermined gate range is two. For example, the CMP associated with the maximum displacement for output sample H is located at point J. Therefore, the aperture gate associated with output sample H is shown by bracket 120. Since CMP I associated with the input trace 98 is not within aperture gate 120, input trace 98 is not migrated to the output sample. If the output sample is located at points 108, 110, or 112, then input trace 98 is be migrated to each of the output samples because they are within the aperture range.

A simple equation for demonstrating the determination whether to migrate an input trace to an output sample is:

$$\text{output CRP} - \text{displacement} = \text{input CMP} \pm \text{aperture gate} \quad (1)$$

The "output CRP" is the CMP associated with the output sample, the "displacement" is the displacement value determined from the displacement section, the "input CMP" is the CMP associated with the input trace, and the "aperture gate" is the predetermined number for adjusting the sensitivity of the migration operation. If equation (1) is satisfied, then the input trace is migrated to the output sample.

Figure 8:
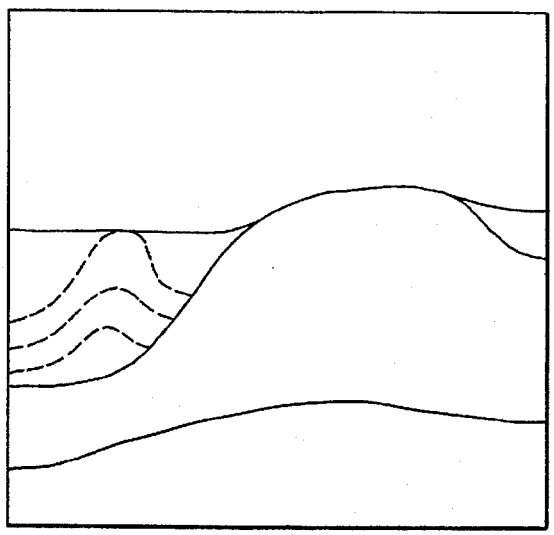
FIG. 8 is a graphical representation of a complex subsurface.

The model based aperture approach, therefore, reduces the time for imaging and prevents the stacking of now relevant data along the meaningless part of the diffraction hyperbola. However, in migrating seismic data collected from a complex subsurface depth, interfaces inconsistent with the interval velocity depth model may be destroyed. For example, FIG. 8 shows a graphical representation of a subsurface where the solid lines represent the given depth model and the dashed lines represent non-conforming interfaces that may be destroyed by the model based aperture migration approach. Yet in this situation, the displacement section mentioned above may be used to determine the migration aperture and, thus, reduce the imaging time over the prior art migration techniques.

Both of the migration methods described above utilize a displacement section generated for the area of interest. It is not critical that the displacement section be generated by the method disclosed. It could be generated from other method known to those of ordinary skill in the art.

Also, it is not critical that the field of travel times be generated using a direct solution of the eikonal equation. Any technique known to those skilled in the art may be used.

The foregoing methods are currently implemented on a computer system, but the data could easily be modified to be implemented on any system capable of manipulating seismic data or the data manipulation even could be implemented by hand.

From the foregoing it will be seen that this invention is one well adapted to attain all of the ends and objects hereinabove set forth, together with other advantages which are obvious and which are inherent to the methods.

It will be understood that certain features and subcombinations are of utility and may be employed without reference to other features and subcombinations. This is contemplated by and is within the scope of the claims.

As many possible embodiments and procedures may be made of the invention without departing from the scope thereof, it is to be understood that all matter herein set forth or shown in the accompanying drawings is to be interpreted as illustrative and not in a limiting sense.

What is claimed is:

1. A method of migrating a seismic input trace in a seismic data section recorded in the time domain from an area of interest into output samples in the depth domain, comprising the steps of generating a field of travel times for the input trace selecting the output samples desired, identifying a displacement for each output sample, locating a common-midpoint ("CMP") associated with the displacement of each output sample, selecting an aperture gate relative to the CMP for each output sample, and migrating the input trace to the output samples using the field of travel times when the input trace CMP is within each aperture gate of each output sample.

2. The method of claim 1, further comprising the steps of generating a displacement section including all the displacements of the output samples from which the CMP are derived.

3. The method of claim 2, wherein generating the displacement section generation comprises the steps of generating an interval velocity section for the area of interest, generating a depth model for the area of interest, developing a displacement model for each seismic horizon by performing ray tracing on the depth model utilizing the velocity section, and interpolating the displacement model to generate a displacement section for the area of interest.

4. The method of claim 1, wherein the field of travel times is determined by using a ray tracing technique.

5. A method of migrating each seismic input trace in a seismic data section recorded in the time domain from an area of interest into output samples in the depth domain utilizing the Kirchoff integration algorithm, comprising the steps of generating a displacement section for the seismic data section, identifying the maximum displacement on the displacement section, selecting a migration algorithm that requires an aperture, selecting an algorithm aperture based on the maximum displacement, and migrating each seismic trace to the depth domain data set using the migration algorithm with the selected aperture.

6. The method of claim 5, wherein generating the displacement section comprises the steps of generating an interval velocity section for the area of interest, generating a depth model for the area of interest, developing a displacement model for each seismic horizon by performing ray tracing on the depth model utilizing the velocity section, and interpolating the displacement model to generate a displacement section for the area of interest.

7. The method of claim 5, wherein the migration algorithm aperture is two times the maximum displacement.

8. The method of claim 5, wherein the migration algorithm is Kirchoff's integration algorithm.

9. A method of verifying accuracy of an interval velocity section of a seismic data section, comprising the steps of generating a travel times field for the input trace, recording seismic input traces in the time domain from the area of interest, generating a depth model for the area of interest, developing a displacement model for each seismic horizon in the area of interest by performing ray tracing on the depth model utilizing the velocity section, selecting the output samples desired, interpolating the displacement model to generate a displacement section for the area of interest including the displacements for each output sample, locating a common-midpoint ("CMP") associated with the displacement of each output sample, selecting an aperture gate relative to the CMP for each output sample, migrating each input trace to the output samples using the field of travel times when each input trace CMP is within the aperture gate of each output sample, and generating a migrated CRP gather for the output samples once all the input traces are migrated, and analyzing the migrated CRP for a predetermined pattern representing the use of an accurate velocity section.

* * * * *